April 19, 1955     J. KARMAZIN     2,706,328
METHOD AND BLANK FOR MAKING TUBING
Filed Nov. 21, 1950
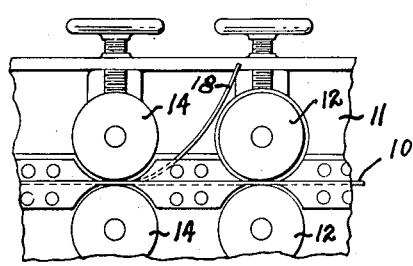
FIG. 1
FIG. 2
FIG. 3
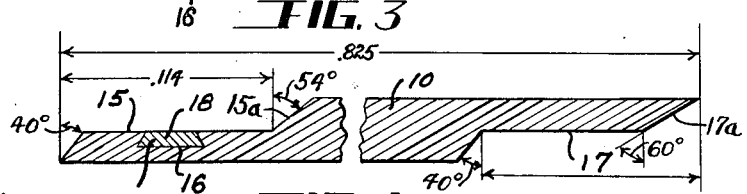
HIGHLY COMPRESSED BONDING MATERIAL     FIG. 4
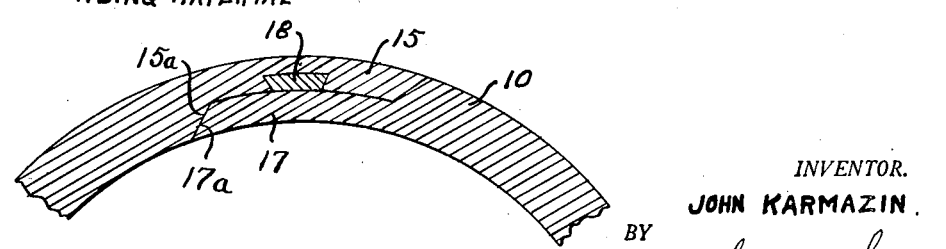
FIG. 5
INVENTOR.
JOHN KARMAZIN.
BY
Dyborg & Dyborg
HIS ATTORNEYS United States Patent Office 2,706,328
Patented Apr. 19, 1955

2,706,328

METHOD AND BLANK FOR MAKING TUBING

John Karmazin, Grosse Ile, Mich.

Application November 21, 1950, Serial No. 196,890

3 Claims. (Cl. 29—156)

This invention relates to tubing and to the method of manufacturing tubing.

In the process of manufacturing tubing from a metal strip, it is desirable practice to reduce the thickness of the edges of the strip and to thereafter bend the strip into tube form with the reduced edges arranged in overlapping relationship. These overlapping edge portions are then bonded to one another so as to form a completed tube. The problem of bonding the overlapping edges introduces numerous problems which are intended to be overcome by the invention set forth herein.

One of the biggest problems in manufacturing any tubing is that of providing adequate and uniform distribution of bonding material along the seam. Various attempts have been made to insert a strip of bonding material directly between the overlapping portions, but such a strip of bonding material prevents the overlapping surfaces from coming in contact with one another, unless the bonding material is placed in a recess. However, when bonding material is placed in a recess or pocket between the overlapping portions of the seam, one normally has to depend on capillary action alone for carrying the bonding material to the surfaces to be bonded and as the bonding material flows from the pocket into the seam, a void is formed as the bonding material leaves the pocket. Voids of this type are very objectionable and, therefore, some means must be provided for providing an adequate supply of bonding material in such manner that the bonding material will flow into the seam without leaving any void.

It is now common practice to place the bonding material directly within the tube adjacent the seam and while this practice may provide an adequate supply of bonding material to the seam without leaving any voids within the seam, it requires the use of an excessive amount of bonding material and does not insure uniform distribution of the bonding material.

It is an object of this invention to compress the bonding material into a groove formed directly adjacent the seam in such a manner that as heat is applied to the bonding material, the natural expansion of the compressed and condensed bonding material will force the necessary amount of molten bonding material into the seam without creating a void.

Another object of this invention is to so control the length of time that the heat is applied to the tubing being bonded, so as to control the flow of bonding material from the pocket in which it is placed into the seam.

Other objects and advantages reside in the construction of parts, the combination thereof and the mode of operation, as will become more apparent from the following description.

In the drawings:

Figure 1 is a fragmentary sectional view showing somewhat diagrammatically a portion of the tube forming apparatus used in the manufacture of the tube;

Figure 2 is a sectional view on an enlarged scale showing the cross sectional shape of the metal strip after having passed through the first pair of forming rollers;

Figure 3 is a similar sectional view showing bonding material inserted into the longitudinally extending pocket formed by the first pair of rollers;

Figure 4 is a similar sectional view showing the shape of the strip and the bonding material after passing between the second pair of forming rollers; and Figure 5 is a fragmentary sectional view showing the finished tube.

Referring now to the drawings wherein I have shown a preferred embodiment of my invention, reference numeral 10 designates a strip of sheet metal used in the manufacture of the tubing. Figure 1 shows the strip 10 passing between a series of pairs of rollers or forming dies carried by the framework 11 and used in forming the strip of metal into tube form. A first pair of rollers 12 serves to form a channel 16 adjacent the one edge of the strip.

It will be noted that the channel 16 is formed along the one edge of the strip before that edge of the strip is flattened. A second pair of rollers 14 serves to flatten out the edges of the strip as indicated at 15 and 17, with the result that the strip 10 takes the shape shown in Figure 4. A bonding wire 18 is placed over the groove or channel 16, as indicated in Figures 1 and 3, before the strip 10 and the bonding material are passed between the rollers 14, so that as the strip and the bonding material 18 pass between the rollers 14, the bonding material is flattened out into the shape shown in Figure 4 and is highly compressed and condensed. The amount of bonding material placed within the channel or pocket 16 is such that none of the bonding material overflows onto the surfaces adjacent the channel 16, but enough bonding material is present so as to be highly compressed by the rollers 14.

The material in the metal strip 10 adjacent the bonding material also seems to be compressed to a certain extent, with the result that when the strip is bent into tube formation with the reduced edges arranged in overlapping relationship, as shown in Figure 5, and heat is applied to the assembly, the natural expansion of the compressed metallic materials, especially the bonding material, will serve to force the necessary amount of bonding material out of the channel 16 onto the surfaces to be bonded without leaving any voids in the channel 16. I have discovered that by controlling the length of time that the tube is heated, it is possible to closely control the flow of bonding material from the channel 16 onto the surfaces to be bonded.

Inasmuch as the forming operations which are used in bending the strip from the shape in which it is shown in Figure 4 to the shape in which it is shown in Figure 5 are all well-known, they need no further description.

An important advantage of the construction shown is that the bonding material is securely held in place within the channel 16 during the tube forming operations even before the bonding material has been heated. Another equally important advantage is that the brazing material 18, as shown in Figure 4, is securely held in place directly at the point where it is needed, whereby it is not necessary to use an excessive amount of bonding material.

The type of material used for the strips 10 is broadly immaterial. Thus, one can use uncoated steel, copper coated steel, cupro nickel, or the like. The bonding material may be of any well-known type such as commonly used in brazing operations.

For purpose of illustration I have shown the use of a single groove or channel 16, whereas two or even more bonding material anchoring pocket means could be provided.

In manufacturing quarter inch tubing having a wall thickness of approximately .028 inch, the width of the strip used, as well as the dimensions of the reduced edge portions, is preferably that shown in Figure 4. By virtue of the construction shown, it is apparent that the joint in the tube constitutes in effect a combination lap and butt joint in that the reduced marginal edge portions 15 and 17 of the strip overlap one another and the end surfaces of the reduced marginal edge portions abut against complementary surfaces of the tube as shown. It will be noted that those surfaces of the strip which abut one another when the strip is formed into tube formation have been bevelled at the angles shown in Figure 4. While these values given in Figure 4 are given for purposes of illustration and may be varied somewhat, they do represent desirable values. Since a certain amount of distortion takes place when the flat strip shown in Figure 4 is bent into tube formation, it is not practical to bevel all of the abutting surfaces the same amount. Thus, the surface 17a has been formed at an angle of 60°, whereas the complementary surface 15a has been formed at an angle of 54°.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of manufacturing tubing having a combination lap and butt joint which comprises forming a longitudinally extending groove adjacent one edge of a strip of material, positioning a length of bonding material in the groove, compressing and flattening the marginal portions of the strip to reduce the marginal portions of the strip to less thickness than the intermediate portion of the strip, compressing the bonding material confined solely to the groove during the compressing and flattening operations, utilizing the step of compressing and flattening the marginal portions to simultaneously form angularly disposed offsets between the reduced margins and said intermediate portion and to form bevelled surfaces at the outer edges of said marginal portions, one of said outer edges being bevelled at a greater angle than the other of said edges, and thereafter bending said strip into tube formation with said last named bevelled outer edge disposed to abut an internally disposed one of said offsets.

2. The method of manufacturing tubing having a combination lap and butt joint which comprises forming a longitudinally extending groove adjacent one edge of a strip of material, positioning a length of bonding material in the groove, compressing and flattening the marginal portions of the strip to reduce the marginal portions of the strip with an inclined surface connecting the reduced marginal portions to the intermediate portion and with bevelled outer edges, the angle formed between one of said bevelled edges and the adjacent flattened marginal portion being greater than the angle formed between said inclined portion and the adjacent reduced marginal portion, and simultaneously compressing and compacting the bonding material solely into the groove.

3. A strip for use in manufacturing tubing comprising a main body portion having a central portion and marginal portions of reduced thickness, said body portion having inclined surfaces connecting the reduced marginal portions to said central portion, said marginal portions each having a bevelled edge for engagement with one of said inclined surfaces, and a strip of bonding material inlaid solely within a groove in one of said marginal portions, one of said edges being bevelled at a greater angle than the other of said edges.

References Cited in the file of this patent

UNITED STATES PATENTS

| | | |
|---|---|---|
| 1,180,859 | Lefever | Apr. 25, 1916 |
| 2,197,191 | Nichols et al. | Apr. 16, 1940 |
| 2,448,907 | Ost | Sept. 7, 1948 |
| 2,475,566 | Karmazin | July 5, 1949 |

FOREIGN PATENTS

| | | |
|---|---|---|
| 347,148 | Great Britain | Oct. 15, 1929 |